US006986462B2

(12) United States Patent
Venkatesh et al.

(10) Patent No.: US 6,986,462 B2

(45) Date of Patent: Jan. 17, 2006

(54) AUTOMATED PARTS LABELING SYSTEM

(75) Inventors: Sid Venkatesh, Renton, WA (US); Sidney Ly, Seattle, WA (US)

(73) Assignee: The Boeing Company, Chicago, IL (US)

( * ) Notice: Subject to any disclaimer, the term of this patent is extended or adjusted under 35 U.S.C. 154(b) by 91 days.

(21) Appl. No.: 10/135,638

(22) Filed: Apr. 30, 2002

(65) Prior Publication Data

US 2003/0201320 A1 Oct. 30, 2003

(51) Int. Cl.
*G06K 15/00* (2006.01)

(52) U.S. Cl. ........................ 235/383; 235/485; 235/487

(58) Field of Classification Search ................ 235/383, 235/385, 470, 485, 487, 375–376, 472.01, 235/472.03; 705/22–23, 28, 408; 700/125, 700/227; 238/81, 101

See application file for complete search history.

(56) References Cited

U.S. PATENT DOCUMENTS 4,484,522 A * 11/1984 Simeth ........................ 101/248
4,529,871 A * 7/1985 Davidson .................... 235/383
4,712,929 A * 12/1987 Kitaoka ........................ 400/76
4,939,674 A * 7/1990 Price et al. .................. 358/1.9
5,226,361 A * 7/1993 Grant et al. .................. 101/44
5,470,427 A * 11/1995 Mikel et al. ................ 156/387
5,484,099 A * 1/1996 Robertson et al. .......... 228/176
5,500,715 A * 3/1996 Ta et al. ........................ 399/1
5,594,838 A * 1/1997 Christopher et al. ....... 358/1.18
5,621,864 A * 4/1997 Benade et al. ............. 358/1.18
5,640,000 A * 6/1997 Spriet et al. ................ 235/375
5,794,213 A * 8/1998 Markman .................... 705/23
5,829,790 A * 11/1998 Phillips ...................... 283/117
5,883,370 A * 3/1999 Walker et al. .............. 235/375
5,923,014 A * 7/1999 Szymusiak et al. ......... 235/375
6,079,890 A * 6/2000 Gross et al. ................ 400/636
6,147,767 A * 11/2000 Petteruti et al. ........... 358/1.18
6,176,427 B1 * 1/2001 Antognini et al. .......... 235/454
6,202,923 B1 * 3/2001 Boyer et al. ................ 235/375
6,294,038 B1 * 9/2001 Majkrzak .................... 156/238
6,464,133 B1 * 10/2002 Gruber ....................... 235/375
6,505,980 B1 * 1/2003 Allday ........................ 400/61
6,533,181 B1 * 3/2003 Roxby et al. ............... 235/494
6,554,188 B1 * 4/2003 Johnson et al. ............. 235/385
6,610,955 B2 * 8/2003 Lopez ........................ 209/584
2002/0029202 A1 * 3/2002 Lopez ........................ 705/406
2002/0035571 A1 * 3/2002 Coult ...................... 707/104.1
2003/0033104 A1 * 2/2003 Gooche ....................... 702/95

* cited by examiner

*Primary Examiner*—Thien M. Le
*Assistant Examiner*—Edwyn Labaze
(74) *Attorney, Agent, or Firm*—Harness Dickey & Pierce P.L.C.

(57) ABSTRACT

A system for marking parts including an automated parts labeling (APL) software module for producing information labels for marking parts, a processor for executing the APL software module, and at least one of peripheral label device communicatively connected to the processor for receiving part identification information from the processor and marking said information labels.

22 Claims, 7 Drawing Sheets

AUTOMATED PARTS LABELING SYSTEM

FIELD OF INVENTION

The invention relates generally to tagging, marking or labeling parts with identification information. More specifically the invention relates to an integrated computer based automated system for tagging, marking or labeling parts

BACKGROUND OF THE INVENTION

Industrial assembly plants must stock a multitude parts to be used during the assembly process. These parts must be identified and cataloged for storage and retrieval of the parts. Typical known methods for marking the parts on the shop floor incorporate using many manual tools and processes. For example, air pencils are used to etch identification numbers in metal tags that are attached to a part, or a rubber stencil or electrical type writer is used to print information on labels that are affixed to a part. Typically, a worker would manually receive a work order and a part, then have to manually read the identification information from the work order. The worker would then have to manually transfer the identification information to a specified type of tag, e.g. metal, paper, plastic, or synthetic, using the appropriate marking device such as the air pencil, typewriter, or rubber stencil. Finally, the worker would attach or affix the identification tag or label to the part. This method is laborious and time consuming, and prone to typographical errors. Additionally, correcting such errors is even more laborious and time consuming.

Therefore, it would be desirable to identify and catalog parts utilizing an automated parts labeling system that utilizes a computer to interface to several peripheral devices such as a printer, a metal tag machine, an ink jet marking machine and a bar code reader.

BRIEF SUMMARY OF THE INVENTION

In one preferred embodiment a system is provided for marking parts including an automated parts labeling (APL) software module for producing information labels for marking parts, a processor for executing the APL software module, and at least one peripheral label device communicatively connected to the processor for receiving part identification information from the processor and marking the information labels.

In another preferred embodiment a method is provided for marking parts. The method includes executing an automated parts labeling (APL) software module utilizing a processor. Additionally, the method includes entering input data, utilizing a processor-user interface, into at least one interactive panel generated by the APL software module. Furthermore, the method includes marking an information label utilizing the APL software module and at least one peripheral label device communicatively connected to the processor.

In yet another preferred embodiment a method is provided for using a computer to mark parts with identification information. The method includes displaying at least one interactive panel having a plurality data entry fields, and receiving input data entered in the data entry fields using a processor-user interface. Additionally, the method includes communicating with a plurality peripheral label devices, thereby instructing the peripheral label devices to mark the input data on an information label.

BRIEF DESCRIPTION OF THE DRAWINGS

The present invention will become more fully understood from the detailed description and accompanying drawings, wherein.

DETAILED DESCRIPTION OF THE INVENTION

Figure 1:
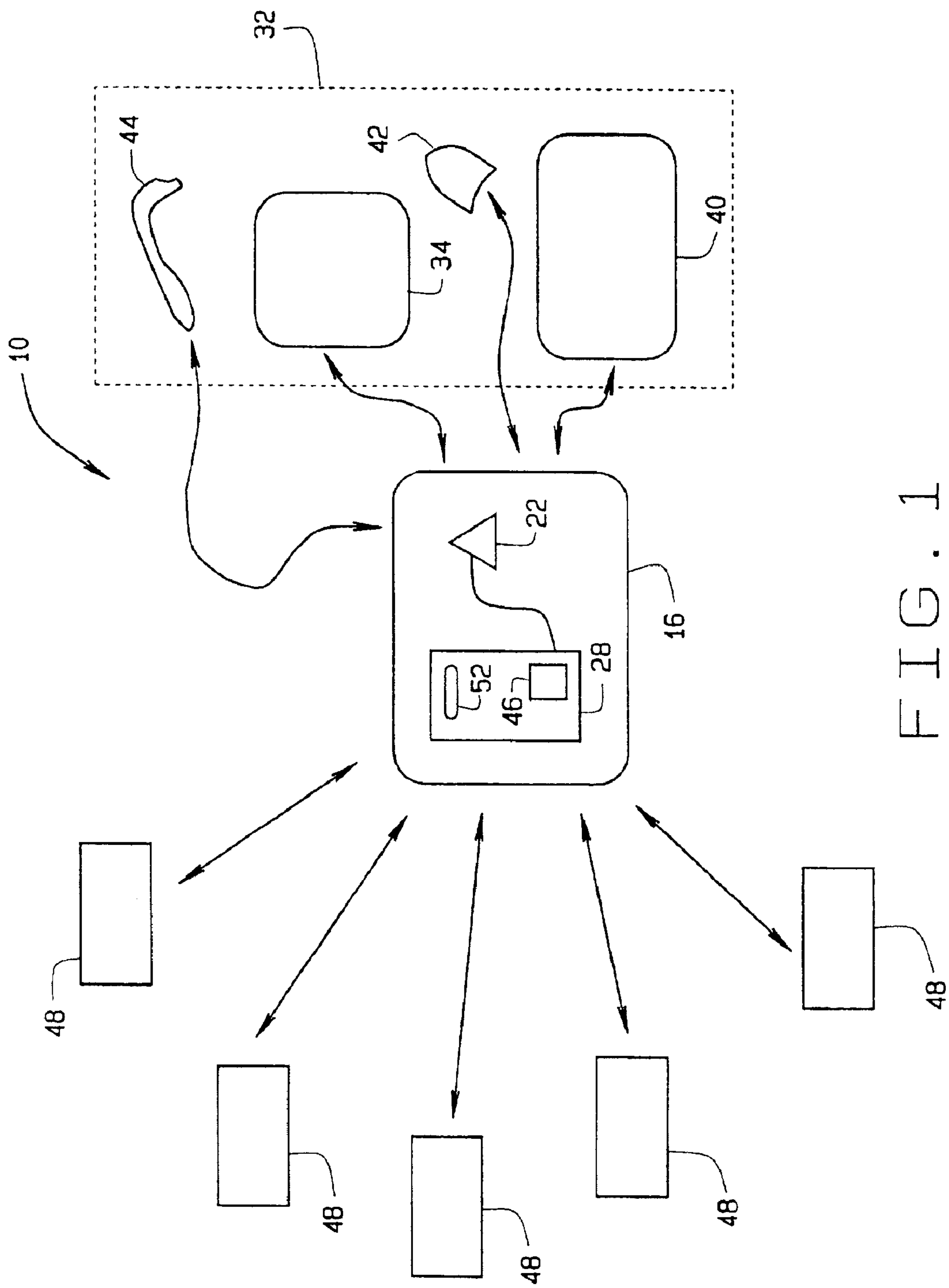
FIG. 1 is a schematic of an automated parts labeling system (APLS) in accordance with a preferred embodiment of the present invention.

FIG. 1 is a schematic of an automated parts labeling system (APLS) 10, in accordance with a preferred embodiment of the present invention. System 10 is can be a stand alone system or a subsystem of network such as a LAN. System 10 is utilized to label parts to be stocked, stored and/or used. As used herein the term "label" or "labeled" is defined to mean any method or device used to put identification information on a part. For example, a label can be a metal tag, a plastic tag, a paper tag, an ink stamp, a metal stamp, a paper label, a synthetic label, or a stencil tag. The parts to be labeled can include anything capable of being labeled, for example, mechanical parts, electrical parts and chemical solutions. The parts can be intended to be used in a stand alone manner or in conjunction with other parts to assemble any system requiring the interconnection of more than one part, such as any device, circuit, structure, machine, equipment, synthetic or composition. An exemplary use of system 10 would be to label parts to be stored, stocked, and/or utilized in a manufacturing facility that assembles or repairs aircraft.

System 10 includes a computer 18 that includes a processor 22 suitable to execute all functions of computer 16, and an electronic storage device 28. Storage device 28 is a computer readable medium, such as a hard drive, for storing such things as software modules or programs, algorithms, information and data. Additionally, system 10 includes a processor-user interface 32. Processor-user interface 32 is connected to computer 16 and includes a display 34, a keyboard 40, a mouse 42 and a bar code scanner 44. Display 34 allows a user to view such things as information, data, and graphical representations, while keyboard 40, mouse 42 and bar code scanner 44 allow a user to input information, data, and queries to computer 16. Display 34, keyboard 40, and mouse 42 are communicatively connected to computer 16 utilizing any suitable computer I/O communication port or connection. For example display 34, keyboard 40, and mouse 42 can be communicatively connected to computer 18 via the standard display, keyboard and mouse connectors/ports or via infrared (IR) or radio frequency (RF) wireless communication connections. Bar code scanner 44 is also connected to computer 16 utilizing any suitable computer I/O connector or port such as a PS2 port, a RS232 port, a parallel port, a USB port, or IR or RF wireless communication connections.

In an alternate embodiment, computer 16 is a laptop computer wherein processor-user interface 32 is included in computer 16 such that display 34 is hingedly connected to computer 16 and keyboard 40 and mouse 42 are integrally formed with computer 16. Bar code scanner 44 is connected to the laptop utilizing any suitable computer I/O connector or port as described above.

Furthermore, system 10 includes a data base 46 and a plurality of peripheral label devices 48. Database 46 is used for storing information and data specific to the parts to be labeled and to the facilities in which the parts are to stocked, stored and/or utilized. For example, database 46 may store algorithms utilized by system 10, and/or a plurality of predefined information or data formats used to label the parts. In a preferred embodiment, database 46 is included in storage device 28. In an alternate embodiment, computer 16 includes database 46 separate from storage device 28. In another alternate embodiment, database 46 is separate from and communicatively connected to computer 16. Peripheral label devices 48 are a variety of printing or marking devices that mark a variety of label types with the desired part identification information. The labels are then at least temporarily, preferably permanently, associated with the corresponding part. For example, peripheral devices 48 could be an ink jet printer used to print directly on the part or print paper or plastic labels or tags affixed to the part, or a metal tag stamping or etching device for marking the information on a metal tag that is affixed or attached to the part. Additionally, peripheral devices 48 could be a synthetic tag device for printing synthetic tags affixed or attached to the part, or a stencil tag device used to create stencils for stamping or marking the part. Peripheral label devices 48 are communicatively linked with computer 16 in any suitable manner, for example, utilizing any standard computer I/O connector or port such as a PS2 port, a RS232 port, a parallel port, a USB port, or utilizing IR or RF wireless communication connections.

System 10 further includes an APLS software module, or program, 52 stored on storage device 28 and executed by processor 22 using inputs from at least one of keyboard 40, mouse 42 and bar code scanner 44. Execution of software module 52 creates at least one interactive screen or panel that is graphically displayed on display 34. The panel graphically displays such things as data entry fields, pull down menus, selectable function buttons and selectable label format options. A user views the panels, selects a desired format, inputs data in the data entry fields and selects a desired function button. The software module, via processor 22, interprets the data, stores the data if necessary on storage device 28 or in database 46, and communicates the formatted input data to the appropriate peripheral label device 48.

Although the description of the present invention is described below in terms of APLS software module 52 having a direct effect on, and direct control of, system 10, is should be understood that it is the instructions generated by the execution of APLS software module 52 by processor 22, and the subsequent implementation of such instructions by processor 22 that have direct effect, on and direct control of, system 10.

Figure 2:
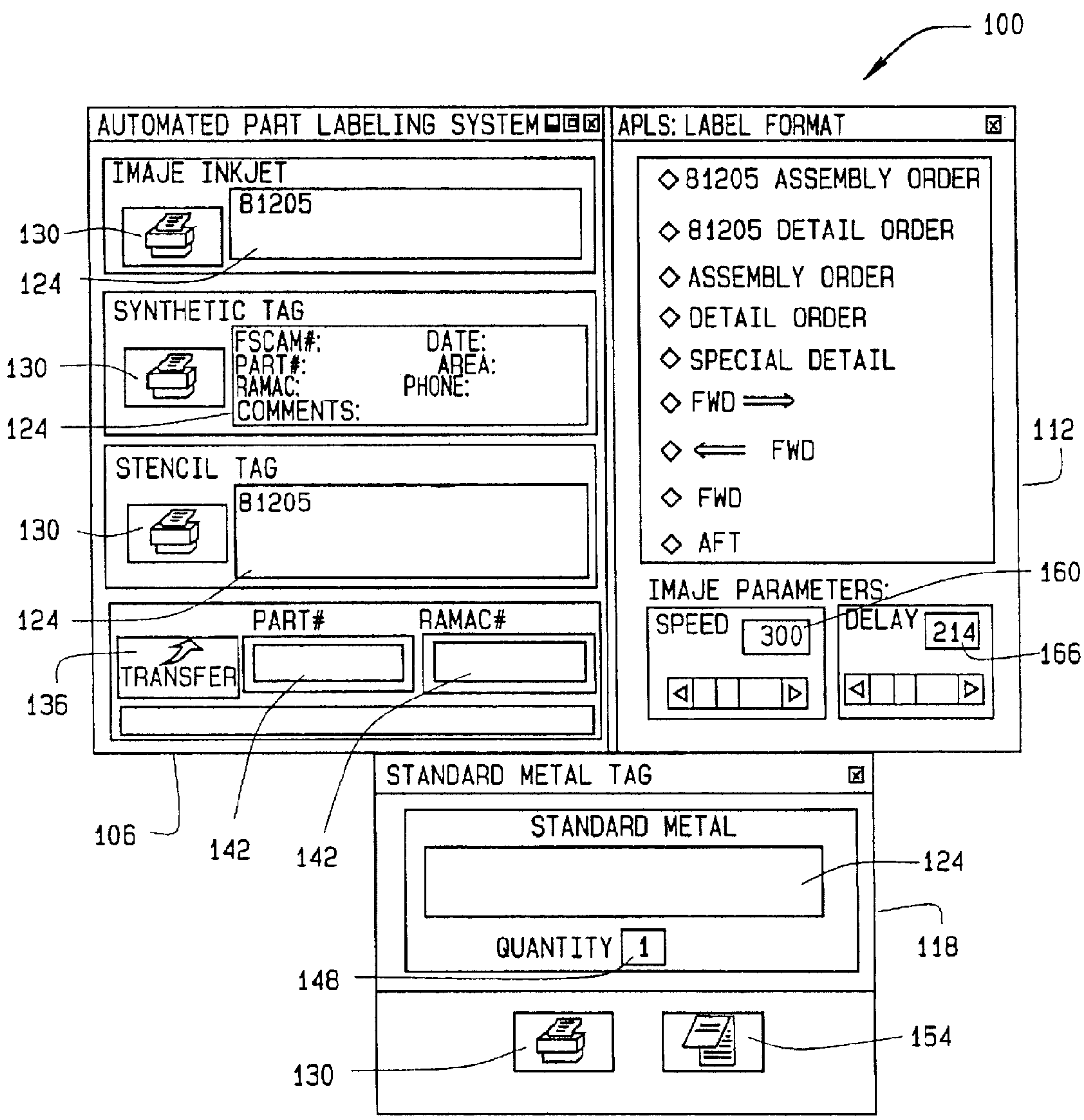
FIG. 2 is an illustration of an APLS Main panel generated by an APLS software module executed by system shown in FIG. 1.

FIG. 2 is an illustration of an APLS Main panel 100 generated by APLS software module 52 (shown in FIG. 1) executed by system 10 (shown in FIG. 1). Main panel 100 includes an APLS information window 106, an APLS format window 112 and a standard metal tag window 118. The APLS Information window 106 includes a plurality of automated data entry fields 124, a plurality of print buttons 130, a transfer button 136 and a plurality of manual data entry fields 142. Standard metal tag window 118 also includes an automated entry field 124 and print button 130. Each automated data entry field 124 is associated with one of the print buttons 130 which is in turn associated with a specific peripheral label device 48. Thus, each automated data entry field 124 and related print button 124 associated with a specific label device 48 and used to produce the specific label type intended for use with the specific label device 48. For example, one print button 130 and data entry field 124 pair is associated with an inkjet printer and utilized to produce a paper identification label, while another print button 130 and data entry field 124 pair is associated with a stencil tag device and utilized to produce a stencil tag.

In one preferred embodiment, the data entered into each automated data entry field 124 is automatically entered using bar code scanner 44. It is envisioned that a user receives a part to be labeled and an accompanying work order that includes information describing the type of label to be affixed to the part and a bar code containing all the information that is to be marked on the label. However, the bar code could be on any other associated paperwork, platform, or media associated with the part and system 10. The user scans the bar code utilizing bar code scanner 44 and APLS software module 52 interprets the information contained in the bar code and automatically enters the information in each automated data entry field 124. Additionally, APLS software module 52 formats the information entered into each automated data entry field 124 in a format specific to the type of label device 48 and label associated with each print button 130 and data entry field 124 pair. For example, APLS software module 52 interprets the scanned bar code information and enters the information in the inkjet automated data entry field 124 such that the data is in a format specific to parts to be labeled using the labels produced by the inkjet label device 48. Additionally, APLS software module 52 enters the information in the synthetic tag automated data entry field 124 such that the data is in a format specific to parts to be labeled using the labels produced by the synthetic tag label device 48.

Alternatively, the user manually enters the information using the transfer button 136 and manual data entry fields 142. It is further envisioned that in addition to the bar code, each work order includes alpha-numeric text containing the identification information to be marked on the label. To manually enter the data, the user utilizes keyboard 40 to manually enter the identification information shown on the work order into manual data entry fields 142. After the information is manually entered, the user selects transfer button 136 using mouse 42 or keyboard 40 and APLS software module 52 interprets the manually input data and enters the data in each automated data entry field 124 in the appropriate format.

It is envisioned that APLS software module utilizes Windows® drivers. Thus, the font of information or data entered in automated data entry fields 124 and manual data entry field 142 can be altered with respect to font size and type, as described below in relation to FIG. 5.

Standard metal tag window 118 includes an automated data entry field 124, print button 130, a quantity field 148 and a metal selection button 154. Quantity field 148 is used to designate how many copies of metal tags the user desires to make. The user manually enters a desired number of copies in the quantity field utilizing keyboard 40. Using mouse 42 or keyboard 40, the user can select metal selection 154 to indicate a desired type of metal the user desires the metal tag to be composed of, for example, stainless steel or aluminum. Upon selection of metal selection button 154, APLS software module 52 presents a pop-up window showing a selection of available metal types from which the user may select one using mouse 42.

Label format window 112 includes a list of selectable label formats specific to a plurality of facilities or locations in which system 10 can be implemented. Various facilities or locations in which system 10 is implemented may desire the identification information on each label be in a specific format and contain certain information. For example, an aircraft wing assembly shop may desire the information on the labels affixed to wing parts be presented in a specific format and showing only specific information contained in the bar code. However, an aircraft landing gear assembly shop may desire the information on the labels affixed to landing gear parts be presented in a different format, showing different specific information contained in the bar code. To specify the desired identification information format, the user can select the desired format before or after entering data in data entry fields 124 or 142. Thus, when a bar code is scanned, APLS software 52 formats the information with respect to the type of tag associated with each automated data entry field and additionally with respect to which format has been selected from label format window 112.

Additionally, label format window 112 includes a speed field 160 and a delay field 166 which are used to set print parameters of the inkjet label device 48. Speed field 160 and delay field 166 are utilized when inkjet label device 48 includes a sensor head (not shown) and is connected to a material handling system used for batch processing. The sensor head is placed on a conveyor system (not shown) on which parts are placed on the conveyor system and pass under the sensor head. Speed field 160 and delay field 166 are set such that as a part passes under the sensor head, inkjet label device 48 prints the identification information directly on the part. Furthermore, each of the APLS information window 106, the APLS format window 112 and the metal tag window 118 includes a close button used to close the respective window. Thus, the user could close any of the windows and just view the remaining windows that have not been closed.

Figure 3:
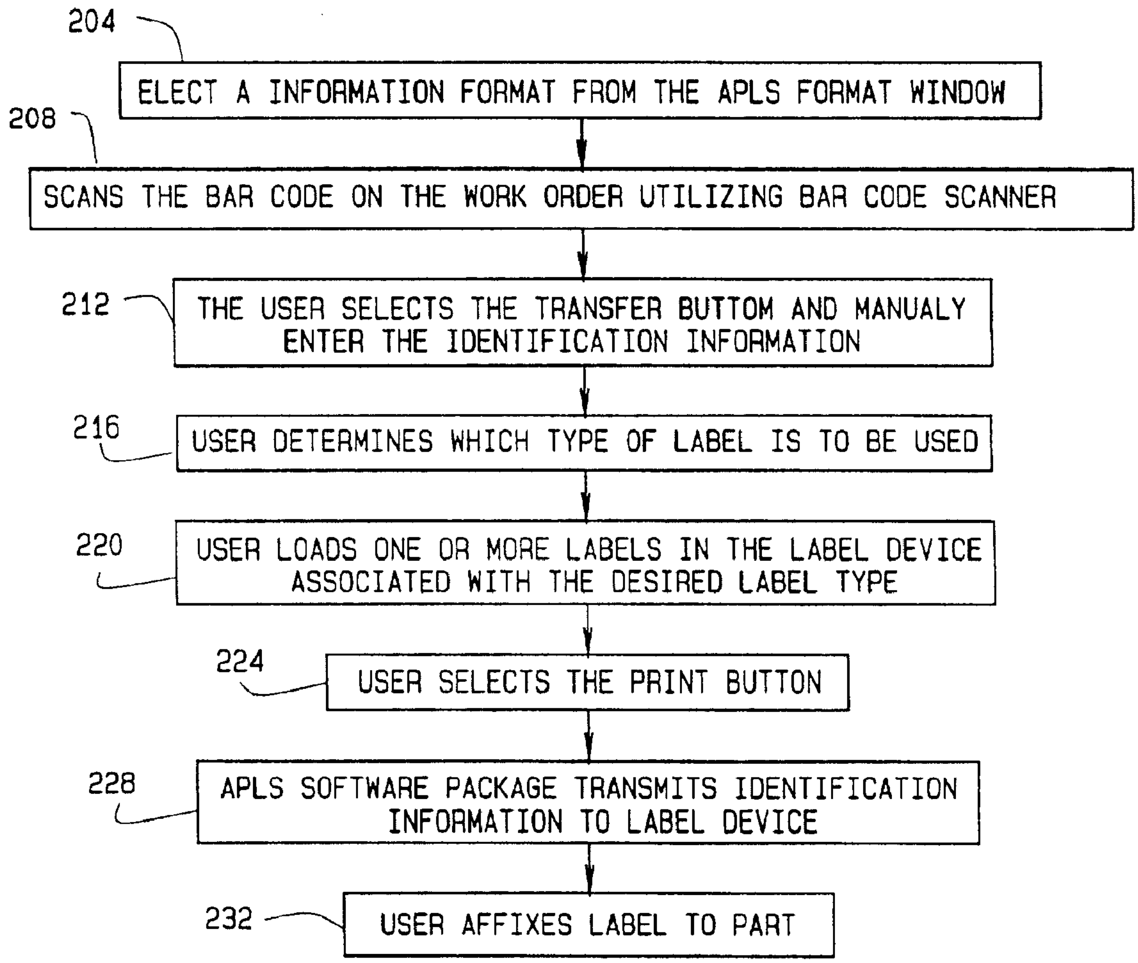
FIG. 3 is a flow chart of a method for automatically labeling parts utilizing the APLS software module executed using system 10 shown in FIG. 1.

FIG. 3 is a flow chart 200 of a method for automatically labeling parts utilizing the APLS software module 52 (shown in FIG. 1) executed using system 10 (shown in FIG. 1). Upon initial execution of APLS software module 52, by processor 22, main panel 100 is presented on display 34. The user then utilizes mouse 42 or keyboard 40 to select an information format from APLS format window 112, as indicated at step 204. After the desired format has been selected, the user scans the bar code on the work order utilizing bar code scanner 44, as indicated at step 208. Alternatively, the user selects transfer button 136 and manually enter the identification information from the work order, as indicated at step 212. Also alternatively, the user could enter data/information in either of the data entry fields 124 or 142, then select a desired information format from APLS format window 112. At which point APLS software module will automatically update the information format data entry fields 124 or 142.

Next the user determines which type of label is to be used based on the information on the work order, e.g. inkjet label, synthetic tag, stencil tag, or metal tag, as indicated at step 216. The user then loads one or more labels in the label device 48 associated with the desired label type, as indicated at step 220. Some label devices 48, such as inkjet label device 48, may include label containers and be self-loading, e.g. a paper drawer containing a plurality of inkjet labels. Conversely, other label devices may require the user to load a label each time a label is to be marked utilizing the related label device 48. For example, the metal tag device may require the user to load a metal tag label each time a metal tag label is to be marked. In which case the user may also be required to load a label having a specific characteristic, for example, the work order may require the user load an aluminum or stainless steel label in metal tag label device 48, or the work order may require the user load a specific color of label in synthetic tag label device 48.

After the desired label is loaded in the proper label device 48, the user selects the print button 130 associated with the type of label to be marked, as indicated at step 224, and APLS software module 52 transmits, as indicated at step 228 the identification data to the label device 48 associated with the selected print button 130. The user then removes the label from label device 48 and affixes the label to the related part, as indicated at step 232. The label is affixed to the related part in any suitable manner and as indicated on the work order. For example the label could be affixed to the part using adhesive, rivets, screws, welding, nailing, nylon tie wraps, tape, or solder.

In an alternate embodiment, processor-user interface 32 includes, and APLS software module 52 is adapted to utilize a touch screen monitor. In which case, in the all instances above, the user can choose not to utilize one or both of mouse 42 and keyboard 40, but instead make selections and enter information/data in Main panel 100 utilizing the touch screen.

APLS software module 52 also includes setup features utilized after APLS software module 52 is first installed on a computer 16. Once APLS software module 52 is installed on computer 16, the APLS software module 52 must be setup, or configured, to meet the specific needs and requirements of the facility or location in which system 10 is deployed.

Figure 4:
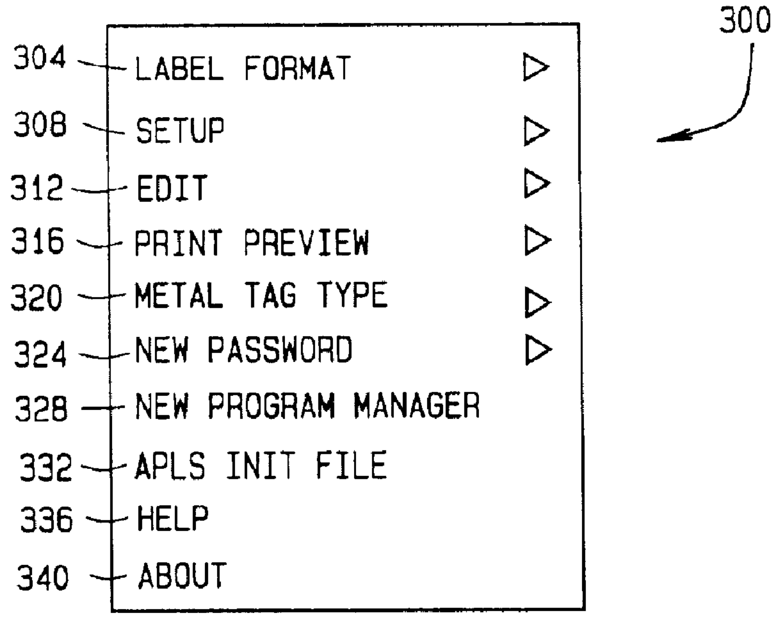
FIG. 4 is an illustration of an APLS Setup panel generated the APLS software module executed by the system shown in FIG. 1.

FIG. 4 is an illustration of an APLS Setup panel 300 generated APLS software module 52 (shown in FIG. 1) executed by system 10 (shown in FIG. 1). APLS software module 52 generates Setup panel 300 when the user depresses an alternate button on mouse 42 when a cursor displayed on display 34 is positioned in any area between buttons, options, and data entry fields on Main panel 100. Typically, the alternate mouse button is the right button, and the procedure to generate Setup panel 300 could alternately be described as ‘Right Clicking’ on the area between buttons, options and data entry fields on Main panel 100. Setup panel 300 includes a Label Format option 304, a Setup option 308, an Edit option 312, a Print Preview option 316, a Metal Tag Type option 320, and New Password option 324, an New Program Manager option 328, an APLS Init File option 332, a Help option 336 and an About option 340.

Figure 5:
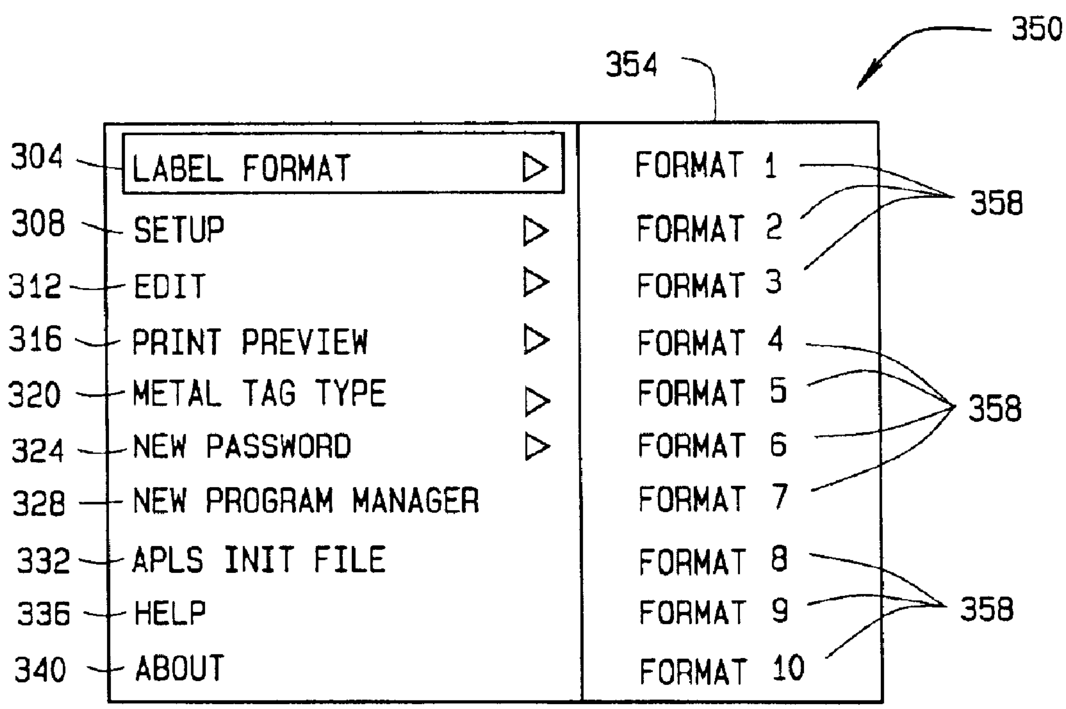
FIG. 5 is an illustration of a Label Format panel generated by the APLS software module when a Label Format option of the Setup panel shown in FIG. 4 is highlighted.

FIG. 5 is an illustration of a Label Format panel 350 generated by APLS software module 52 (shown in FIG. 1)

when the Label Format option 304 of Setup panel 300 (shown in FIG. 4) is highlighted by the user. Label format panel 350 is used to configure default settings dictating how Main panel 100 (shown in FIG. 2) is displayed, e.g. font size of data entered in data entry fields 124 and 142 and what fields and options are displayed, when computer 16 is booted up and APLS software generates Main panel 100. Each facility or location may desire Main panel 100 to be displayed in a manner that is most convenient for that specific facility or location. When the user highlights Label Format option 304, APLS software module 52 generates a pull-down menu 354 that includes a plurality of format options 358. To set the default format of Main panel 100, the user then selects one of format options 358.

Figure 6:
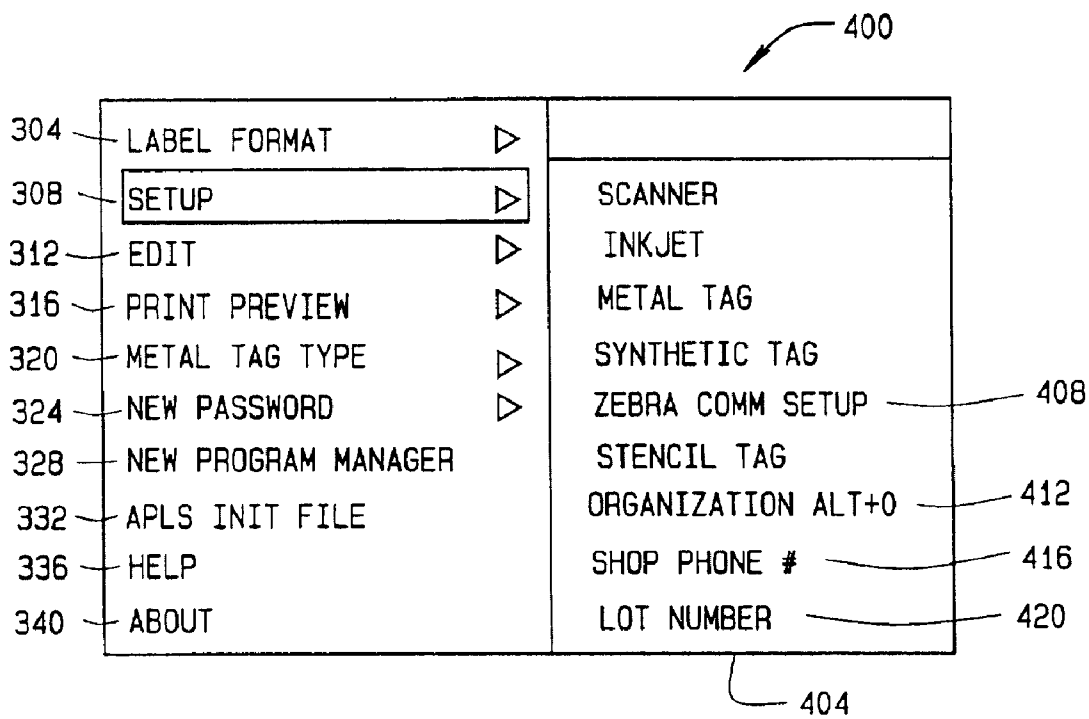
FIG. 6 is an illustration of a Setup panel generated by the APLS software module when a Setup option of the Setup panel shown in FIG. 4 is highlighted.

FIG. 6 is an illustration of a Setup panel 400 generated by APLS software module 52 (shown in FIG. 1) when the Setup option 308 of Setup panel 300 (shown in FIG. 4) is highlighted by the user. Setup panel 400 is used to configure, or setup, the parameters of peripheral label devices 48 (shown in FIG. 1). Each label device 48 must be configured with default settings that allow communication with computer 16, e.g. baud rate, port type, etc. When the user highlights Setup option 308, APLS software module 52 generates a pull-down menu 404 that includes a plurality of names of label devices 48 that can be configured. To set the default settings of a specific label device 48, the user selects the name of the label device 48 shown in pull-down menu 404. At which point, APLS software module 52 generates at least on subsequent interactive window (not shown) that allows the user to select or enter the desired default settings.

Additionally, pull-down menu 404 includes a Zebra Comm Setup option 408, an Organization option 412, a Shop Phone # option 416 and a Lot Number option 420. Zebra Comm Setup option 408 is used to configure the parameters of scanner 44 (shown in FIG. 1). Organization option 412 is used input the identification of the facility or location in which system 10 is deployed. Likewise, Shop Phone # option 416 and Lot Number option 420 are used input the phone number and lot number of the facility or location in which system 10 is deployed. The facility identification, phone number and lot number are all then included the information marked on each label produced by system 10.

Figure 7:
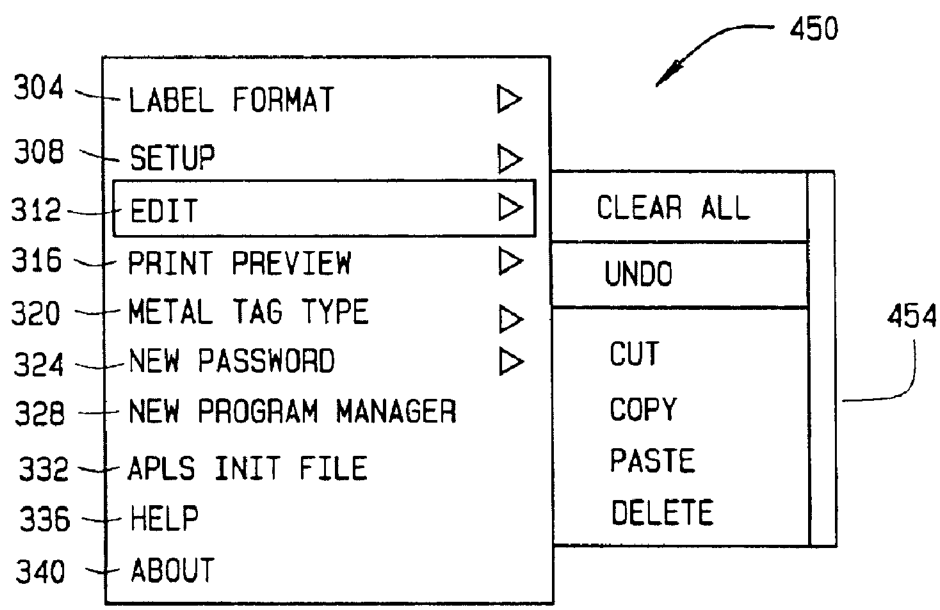
FIG. 7 is an illustration of an Edit panel generated by the APLS software module when an Edit option of the Setup panel shown in FIG. 4 is highlighted.

FIG. 7 is an illustration of an Edit panel 450 generated by APLS software module 52 (shown in FIG. 1) when the Edit option 312 of Setup panel 300 (shown in FIG. 4) is highlighted by the user. Edit panel 450 is used to edit any information or data entered in any panel generated by APLS software module 52. When the user highlights Edit option 312, APLS software module 52 generates a pull-down menu 454 that includes stand Windows® edit options such as cut, copy, and paste, which can be used to edit any data entered in data entry fields 124 and 142 (shown in FIG. 2).

Figure 8:
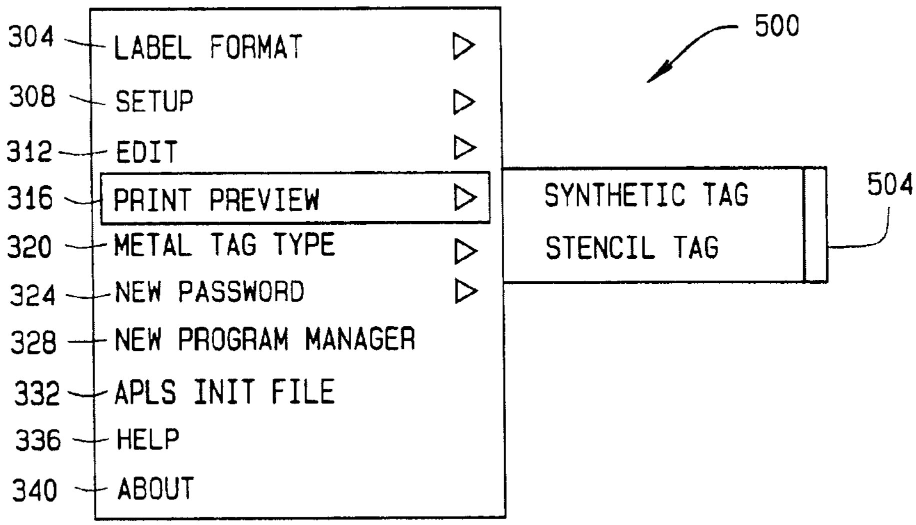
FIG. 8 is an illustration of a Print Preview panel generated by the APLS software module when a Print Preview option of the Setup panel shown in FIG. 4 is highlighted.

FIG. 8 is an illustration of a Print Preview panel 500 generated by APLS software module 52 (shown in FIG. 1) when the Print Preview option 316 of Setup panel 300 (shown in FIG. 4) is highlighted by the user. Print Preview panel 500 is used to preview how a label will appear once the label is marked with the identification information. Thus, if utilization of Print Preview panel 500 shows that all the identification information will not fit on the label, the user can reduce the font size Label Format option 304. When the user highlights Print Preview option 316, APLS software module 52 generates a pull-down menu 504 that includes a list of the various label devices 48 for which the user can preview the label prior to marking the label, e.g. inkjet label device, synthetic tag label device, and stencil tag label device.

Figure 9:
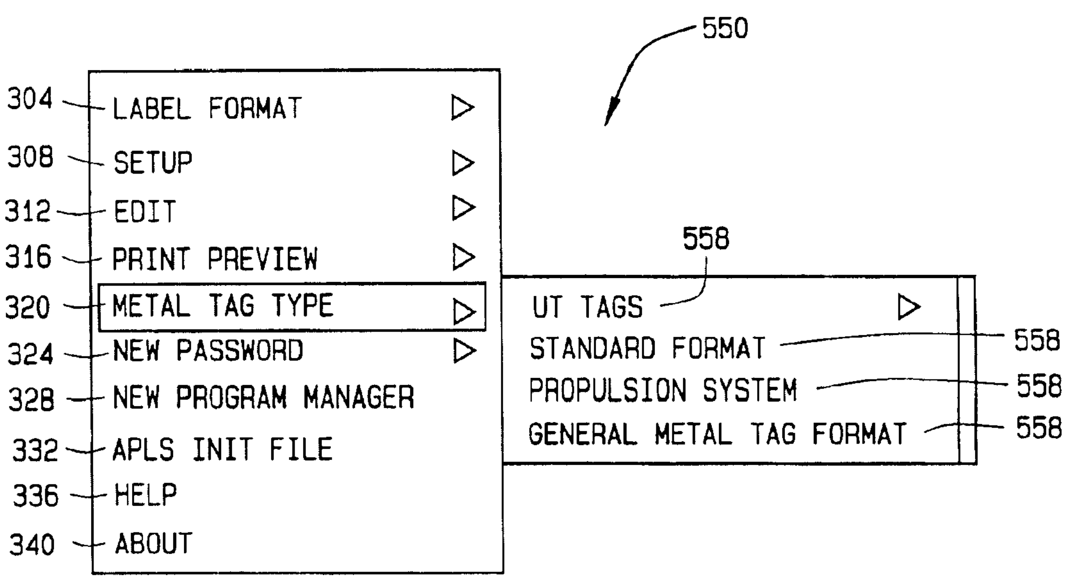
FIG. 9 is an illustration of a Metal Tag Type panel generated by the APLS software module when a Metal Tag Type option of the Setup panel shown in FIG. 4 is highlighted.

FIG. 9 is an illustration of a Metal Tag Type panel 550 generated by APLS software module 52 (shown in FIG. 1) when the Metal Tag Type option 320 of Setup panel 300 (shown in FIG. 4) is highlighted by the user. Metal Tag Type panel 550 is used to include additional information on the metal tag labels marked using metal tag label device 48. Some parts, for example an engine block, may require that specific characteristics of the part, for example stress values or maximum load, be marked on the identification label. If a user is going to use metal tag labels to label a plurality of parts that require the same characteristic information be marked on the label, the user highlights utilizes Metal Tag Type option 320 and APLS software module generates pull-down menu 554 that include a plurality of information options 558. The user then selects the desired information to be marked each label from pull-down menu 554. For example if all metal tags were to be marked with propulsion system information, the user would select the propulsion system option 558 from pull-down menu 554 If no additional part characteristic information is desired to be marked on the metal tag label, the user selects the general metal tag option 558 from pull-down menu 554.

Figure 10:
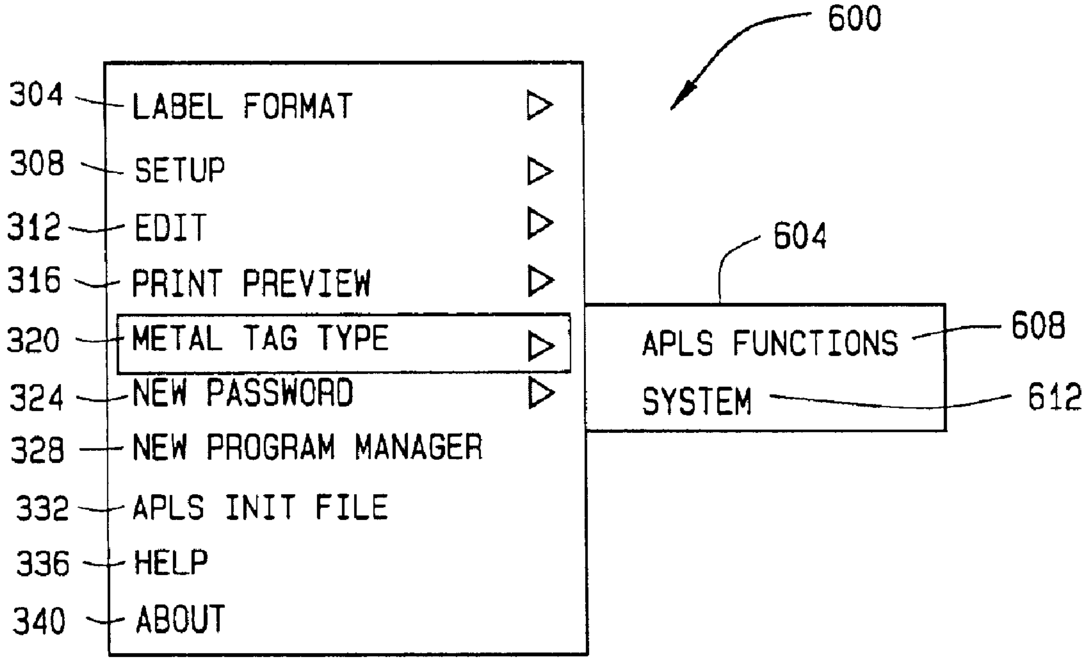
FIG. 10 is an illustration of a New Password panel generated by the APLS software module when a New Password option of the Setup panel shown in FIG. 4 is highlighted.

FIG. 10 is an illustration of a New Password panel 600 generated by APLS software module 52 (shown in FIG. 1) when the New Password option 320 of Setup panel 300 (shown in FIG. 4) is highlighted by the user. APLS software module 52 utilizes password to protect the system configuration and setup from unwanted changes. When the user 'Right Clicks' on Main panel 100 to evoke Setup panel 300, APLS software module requires the user to enter an APLS function password to indicate that the user is authorized to make changes to the APLS functions as described above in reference to FIGS. 4–9. Furthermore, a user desires to change the manner in which APLS software module 52 interacts with the operating system installed on computer 16, for example if the user desired to alter an .ini file, APLS software module 52 requires the user to enter a system password. New Password panel 550 is used to enable the user change the APLS functions password and/or the system password.

When the user highlights New password option 324, APLS software module 52 generates pull-down menu 604 that include an APLS Function option 608 and a System option 612. To change the APLS function password the user selects APLS Function option 608 and enters the desired new password in a subsequent window (not shown) generated by APLS software module 52. Likewise, if the user desires to change the system password the user selects System option 612 and enters the new password accordingly.

Referring to FIG. 4 APLS Init File option 332 is used for configuring computer 16 such that processor 22 properly executes software module 52. Upon boot-up of computer 16 an APLS.ini file is executed that contains configuration information that configures computer 16 to run software module 52. As computer 16 is booted-up all the information in the APLS.ini file is read by processor 22 and displayed on display 34.

When the user selects Help option 336, APLS software module generates a help menu (not shown) that provides the user with information about using APLS software module 52. The appearance and functionality of the Help menu generated is essentially the same as a standard well know Windows® Help menu.

About option 340 is used display information about software module 52, such as the version, compliancy, and date the installed version was created.

While the invention has been described in terms of various specific embodiments, those skilled in the art will recognize that the invention can be practiced with modification within the spirit and scope of the claims.

What is claimed is:

1. A system for marking manufacturing assembly parts with identification information, said system comprising:

a processor;

an automated parts labeling (APL) module executed by said processor for generating at least one interactive panel;

a processor-user interface for displaying the interactive panel; and at least two dissimilar part marking devices simultaneously communicatively connected to said processor, each dissimilar part marking device configured to:

mark a different type of manufacturing assembly part; and mark a surface of duplicated manufacturing assembly parts with same identification data identifying the duplicated manufacturing assembly parts;

wherein said at least two dissimilar part marking devices comprise at least two different ones of an ink jet printer, a metal tag marking device, a synthetic tag marking device and a stencil tag generating device.

2. The system of claim 1, wherein said processor-user interface comprises at least one of a display, a keyboard, a mouse, and a bar code scanner.

3. The system of claim 2, wherein said interactive panel comprises a plurality of data entry fields, each said peripheral part marking device having at least one said data entry field related thereto, and said processor-user interface is utilized to input identification data in said data entry field.

4. The system of claim 3, wherein said bar code scanner is utilized to automatically input said identification data in said data entry fields.

5. The system of claim 3, wherein said interactive panel further comprises a plurality of print buttons, each said print button specific to an independent one of said peripheral part marking devices, said print buttons being used for communicating said input identification data to the respective said peripheral part marking device.

6. The system of claim 2, wherein said interactive panel further comprises a label format window for selecting a format of said input identification data.

7. The system of claim 2, wherein said interactive panel further comprises a metal tag window for use when a metal label is desired.

8. The system of claim 2, wherein said interactive panel further comprises a transfer button for use when manually entering identification data using said keyboard.

9. The system of claim 1, wherein the manufacturing assembly parts comprise at least one of mechanical parts, electrical parts and chemical solutions.

10. The system of claim 1, wherein the manufacturing assembly parts are configured to be used in conjunction with at least one other manufacturing assembly part to assemble at least one of a device, circuit, structure, machine, equipment, synthetic and composition.

11. A method for marking manufacturing assembly parts with identification information, wherein said method comprises:

generating at least one interactive panel utilizing a processor, wherein the interactive panel allows a user to automate marking at least two dissimilar manufacturing assembly parts with identification data specific to each manufacturing assembly part, the identification data used to identify the respective part;

entering the identification data, utilizing a processor-user interface, in the interactive panel; and marking each manufacturing assembly part with the identification data specific to the respective manufacturing assembly part utilizing at least two dissimilar peripheral part marking devices simultaneously communicatively connected to the processor, each dissimilar manufacturing assembly part being marked using a different one of the dissimilar part marking devices, wherein the dissimilar part marking devices comprise at least two different ones of an ink jet printer, a metal tag marking device, a synthetic tag marking device and a stencil tag generating device.

12. The method of claim 11, wherein the processor-user interface includes at least one of a display, a keyboard, a mouse, and a bar code scanner, and wherein generating at least one interactive panel comprises displaying the interactive panel utilizing the processor-user interface.

13. The method of claim 12, wherein the interactive panel includes a label format window and a data window having a plurality of data entry fields, each of the peripheral part marking devices having at least one data entry field related thereto, and wherein entering identification data comprises:

selecting an identification data format utilizing the label format window; and entering identification data in the data entry fields utilizing the processor-user interface.

14. The method of claim 13, wherein entering data further comprises automatically entering data utilizing the bar code scanner.

15. The method of claim 13, wherein the data window further includes a transfer button, and wherein entering identification data further comprises:

selecting the transfer button; and manually entering the identification data utilizing the keyboard.

16. The method of claim 13, wherein the data window further includes a plurality of print buttons, each print button specific to an independent one of the peripheral part marking devices, and wherein marking each manufacturing assembly part comprises:

loading the respective peripheral part marking devices with an information label suitable for use with the respective peripheral part marking device; and selecting a specific one of print buttons such that the processor communicates the identification data to the respective peripheral part marking device, whereby the respective peripheral part marking device marks the information label with the identification data in the selected data format.

17. The method of claim 12, wherein the interactive panel includes a metal tag window including a data entry field and a print button, and wherein marking each manufacturing assembly part comprises:

entering data in the data entry field utilizing the processor-user interface;

loading the peripheral part marking device with a metal information label; and selecting the print button such that the processor communicates the identification data to the peripheral part marking device, whereby the peripheral part marking device marks the metal information label with the identification data.

18. A method for using a computer to mark manufacturing assembly parts with identification information, the method comprising:

displaying at least one interactive panel on a processor-user interface, said interactive panel having a plurality data entry fields, wherein each data entry field is related to a specific one of a plurality of dissimilar peripheral part marking devices simultaneously communicatively connected to the computer and each dissimilar peripheral part marking device configured to mark a surface of a different type of manufacturing assembly part;

receiving identification data entered in said data entry fields using said processor-user interface, wherein the identification data is used to identify a plurality of duplicated manufacturing assembly parts; and communicating with the dissimilar peripheral part marking devices, thereby instructing one of said dissimilar peripheral part marking devices to mark the like manufacturing assembly parts with said identification data, wherein the dissimilar part marking devices comprise at least two different ones of an ink jet printer, a metal tag marking device, a synthetic tag marking device and a stencil tag generating device.

19. The method of claim 18, wherein displaying at least one interactive panel comprises providing instructions interpretable by the computer to instruct the computer to display said interactive panel having a label format window, a data window including said data entry fields and a plurality of print buttons, each print button associated with an independent one of the dissimilar peripheral part marking devices, and a metal tag window having one of said data entry fields and a corresponding print button.

20. The method of claim 19, wherein receiving identification data comprises providing instructions interpretable by the computer to instruct the computer to:

receive said identification data from a bar code scanner; and format said received identification data based on a format selected utilizing said label format window.

21. The method of claim 20, wherein communicating with a plurality of dissimilar peripheral part marking devices comprises providing instructions interpretable by the computer to instruct the computer to communicate with a specific one of said peripheral part marking devices upon selection of a specific one of said print buttons, thereby instructing said specific peripheral part marking device to mark said identification data entered in said data entry field corresponding to said specific peripheral part marking device on an information label compatible with said specific peripheral part marking device.

22. The method of claim 19, wherein receiving identification data comprises providing instructions interpretable by the computer to instruct the computer to:

display said data window having a transfer button; and receive identification data manually entered using a keyboard upon selection of said transfer button.

* * * * *